(12) United States Patent
Hirayama et al.

(10) Patent No.: US 12,275,472 B2
(45) Date of Patent: Apr. 15, 2025

(54) VEHICLE

(71) Applicant: JFE STEEL CORPORATION, Tokyo (JP)

(72) Inventors: Hideki Hirayama, Sapporo (JP); Yusuke Kaneta, Sapporo (JP); Shinji Nanba, Tokyo (JP); Haruhisa Sakai, Tokyo (JP); Toshiyuki Kohara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 196 days.

(21) Appl. No.: 18/247,643

(22) PCT Filed: Jul. 8, 2021

(86) PCT No.: PCT/JP2021/025761
§ 371 (c)(1),
(2) Date: Apr. 3, 2023

(87) PCT Pub. No.: WO2022/074887
PCT Pub. Date: Apr. 14, 2022

(65) Prior Publication Data
US 2023/0391398 A1    Dec. 7, 2023

(30) Foreign Application Priority Data
Oct. 6, 2020    (JP) ................ 2020-169211

(51) Int. Cl.
*B62D 6/00* (2006.01)
*B62D 7/15* (2006.01)

(52) U.S. Cl.
CPC ........... *B62D 6/002* (2013.01); *B62D 7/15* (2013.01)

(58) Field of Classification Search
CPC .................. B62D 6/00; B62D 6/002
See application file for complete search history.

(56) References Cited

U.S. PATENT DOCUMENTS

| | | | |
|---|---|---|---|
| 10,407,035 B1* | 9/2019 | Gadda | B60W 10/20 |
| 2015/0329108 A1* | 11/2015 | Kodaira | B60W 30/12 |
| | | | 701/41 |

(Continued)

FOREIGN PATENT DOCUMENTS

| | | |
|---|---|---|
| CN | 107544520 B | 9/2020 |
| JP | H08161048 A | 6/1996 |

(Continued)

OTHER PUBLICATIONS

Sep. 28, 2021, International Search Report issued in the International Patent Application No. PCT/JP2021/025761.

(Continued)

*Primary Examiner* — Long T Tran
(74) *Attorney, Agent, or Firm* — KENJA IP LAW PC

(57) ABSTRACT

A vehicle: finds a common central point at which a difference between a distance from a current position of a first tire and a distance from a target position of the first tire is within a predetermined range and a difference between a distance from a current position of a second tire and a distance from a target position of the second tire is within a predetermined range; and sets a steering angle of each of a plurality of tires so that the tire will be oriented in a direction of a tangent to a clearance circle whose center is the common central point or oriented in a direction whose angle difference from the direction of the tangent is within a predetermined range.

3 Claims, 7 Drawing Sheets

(56) References Cited

U.S. PATENT DOCUMENTS

| | | | | |
|---|---|---|---|---|
| 2015/0336607 A1* | 11/2015 | Inoue | ................. | B60W 30/10 |
| | | | | 701/41 |
| 2018/0281849 A1* | 10/2018 | Irie | ................. | B62D 6/008 |
| 2019/0092390 A1* | 3/2019 | Ide | ................. | B60W 30/182 |
| 2019/0315404 A1* | 10/2019 | Hayashi | ................. | B62D 1/286 |
| 2020/0317196 A1* | 10/2020 | Yoshida | ................. | B60W 30/181 |
| 2020/0346639 A1* | 11/2020 | Tashiro | ................. | G08G 1/168 |
| 2020/0406888 A1* | 12/2020 | Hamai | ................. | B60W 10/20 |
| 2021/0192956 A1* | 6/2021 | Takeda | ................. | G08G 1/167 |

FOREIGN PATENT DOCUMENTS

| | | | |
|---|---|---|---|
| JP | H1165662 | A | 3/1999 |
| JP | 3012651 | B2 | 2/2000 |
| JP | 3952548 | B2 | 8/2007 |
| JP | 2010020515 | A | 1/2010 |
| JP | 2018172050 | A | 11/2018 |
| JP | 2019109864 | A | 7/2019 |
| WO | 2020183988 | A1 | 9/2020 |

OTHER PUBLICATIONS

Jan. 4, 2024, the Extended European Search Report issued by the European Patent Office in the corresponding European Patent Application No. 21877191.3.

* cited by examiner

VEHICLE

TECHNICAL FIELD

The present disclosure relates to a vehicle that travels on a preset travel route.

BACKGROUND

Vehicles that travel on preset travel routes include vehicles configured to set a different steering angle for each of a plurality of tires to enable complex movement on the site (see, for example, JP 2010-20515 A (PTL 1)).

CITATION LIST

Patent Literature

PTL 1: JP 2010-20515 A

SUMMARY

Technical Problem

In the case where the foregoing vehicle deviates from the travel route for some reason, it is desirable that the vehicle quickly returns to the travel route without performing unnecessary operation. It could therefore be helpful to provide a vehicle that, upon deviating from a travel route, can return to the travel route efficiently.

Solution to Problem

A vehicle according to an aspect of the present disclosure is a vehicle configured to travel on a preset travel route, comprising: a plurality of tires including a first tire and a second tire, and each configured to be set at a different steering angle; and a processing device configured to set a steering angle of each of the plurality of tires, wherein the processing device is configured to: when the vehicle deviates from the travel route and returns to the travel route, determine a return position on the travel route, and calculate a target position of the first tire and a target position of the second tire that allow the vehicle to travel on the travel route when located at the return position; find a common central point at which a difference between a distance from a current position of the first tire and a distance from the target position of the first tire is within a predetermined range and a difference between a distance from a current position of the second tire and a distance from the target position of the second tire is within a predetermined range; and set the steering angle of each of the plurality of tires so that the tire will be oriented in a direction of a tangent to a clearance circle whose center is the common central point and whose radius is a distance to the common central point or oriented in a direction whose angle difference from the direction of the tangent is within a predetermined range.

Advantageous Effect

It is thus possible to provide a vehicle that, upon deviating from a travel route, can return to the travel route efficiently.

BRIEF DESCRIPTION OF THE DRAWINGS

In the accompanying drawings.

DETAILED DESCRIPTION

Overview of Vehicle

Figure 1:
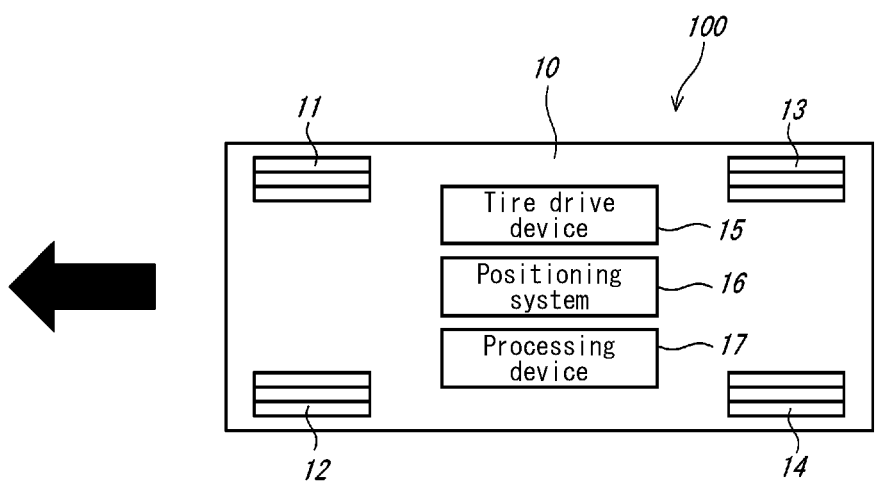
FIG. 1 is a schematic plan view of a vehicle.

An overview of a vehicle 100 according to an embodiment will be described below. FIG. 1 is a schematic plan view of the vehicle 100. The vehicle 100 travels on a preset travel route. The vehicle 100 may be configured to travel autonomously on the travel route, or configured to travel partially manually (for example, manually only during acceleration/deceleration and otherwise autonomously) on the travel route.

As illustrated in FIG. 1, the vehicle 100 includes a vehicle body 10, a plurality of tires 11 to 14, a tire drive device 15, a positioning system 16, and a processing device 17.

The vehicle body 10 is configured to be able to carry heavy objects. In this embodiment, the vehicle body 10 has a substantially rectangular shape in a plan view. When the vehicle 100 travels on the travel route, the vehicle 100 travels in the longitudinal direction of the vehicle body 10 with one longitudinal end of the vehicle body 10 in front. In this embodiment, the left end of the vehicle body 10 in the drawing is in front, and the vehicle 100 travels leftward in the drawing (see the arrow). The use, shape, and direction of travel of the vehicle body 10 are not limited to such.

The plurality of tires 11 to 14 include a first tire 11 corresponding to the right front wheel, a second tire 12 corresponding to the left front wheel, a third tire 13 corresponding to the right rear wheel, and a fourth tire 14 corresponding to the left rear wheel. The arrangement of the tires 11 to 14 is, however, not limited to such. The number of tires included in the vehicle 100 is not limited to four.

The tire drive device 15 rotates the tires 11 to 14 and sets their steering angles (i.e. the angles of the tires 11 to 14 with respect to the vehicle body 10). The tire drive device 15 in this embodiment can set a different rotation speed and steering angle for each of the tires 11 to 14. The tire drive device 15 may rotate the tires 11 to 14 using an internal combustion engine, or rotate the tires 11 to 14 using an electric motor. The steering angle of each of the tires 11 to 14 is feedback-controlled based on the results of detection by a steering angle detection sensor.

The positioning system 16 is a system that measures the current position (which is the center position of the vehicle body 10 in this example, but is not limited to such) and orientation of the vehicle body 10. The positioning system 16 in this embodiment includes a global navigation satellite system (GNSS) receivers in the front and rear parts of the vehicle body 10, and can measure the detailed positions of the front and rear parts of the vehicle body 10. Based on the positions of the front and rear parts of the vehicle body the positioning system 16 calculates the current position and orientation of the vehicle body 10. The positioning system 16 may measure the current position and orientation of the vehicle body 10 by any method other than the above, such as using a camera. The positioning system 16 may include only one receiver that has two antennas. The positioning system 16 may include only one receiver, and calculate (obtain) the orientation of the vehicle body 10 based on the measured latest position of the vehicle body 10 and the position of the vehicle body 10 a predetermined time before the latest position.

The processing device 17 includes a processor, a volatile memory, a nonvolatile memory, an I/O interface, and the like. The processing device 17 is electrically connected to the positioning system 16, and can acquire the current position and orientation of the vehicle body 10 from the positioning system 16. The processing device 17 is also electrically connected to the tire drive device 15, and can transmit a control signal to the tire drive device 15 to control the tire drive device 15 and set the rotation speed and steering angle of each of the tires 11 to 14.

The nonvolatile memory in the processing device 17 stores data of the preset travel route of the vehicle 100, and data of a route return program. The processor in the processing device 17 performs computation using the volatile memory based on the route return program. The processing device 17 transmits a control signal to the tire drive device 15 based on the results of computation in the volatile memory.

<Route Return Program>

Figure 2:
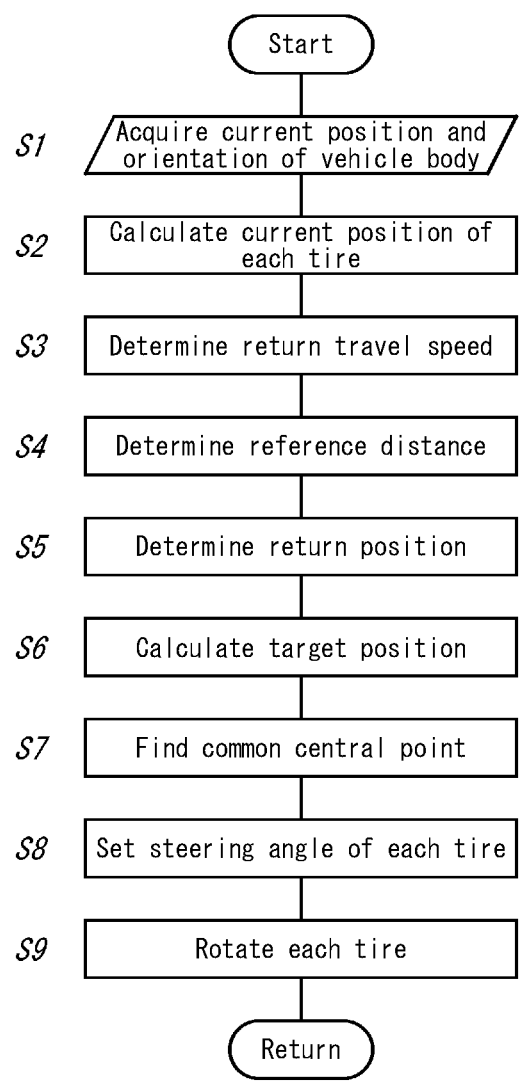
FIG. 2 is a flowchart of a route return program.

The route return program will be described below. FIG. 2 is a flowchart of the route return program. The route return program is a program for causing the vehicle 100 that has deviated from the travel route to return to the travel route, and is executed during travel on the travel route. The process illustrated in FIG. 2 is executed by the processing device 17.

After the route return program is started, the processing device 17 acquires the current position and orientation of the vehicle body 10 (step S1). The current position and orientation of the vehicle body 10 can be acquired from the positioning system 16.

The processing device 17 then calculates the current position of each of the tires 11 to 14 (step S2). Since the relative position of each of the tires 11 to 14 with respect to the vehicle body 10 is known, the current position of each of the tires 11 to 14 can be calculated based on the current position and orientation of the vehicle body 10.

The processing device 17 then determines the travel speed (hereinafter referred to as "return travel speed") when the vehicle 100 returns to the travel route (step S3). The return travel speed is determined based on the travel speed of the vehicle 100 during execution of a route travel program and conditions such as the weight of the load on the vehicle body 10. For example, if the load on the vehicle body 10 is light, the return travel speed may be set to be high. Alternatively, the return travel speed may be constant. Step S3 can be omitted in this case.

The processing device 17 then determines a reference distance (step S4). The reference distance is determined depending on the return travel speed determined in step S3. In this embodiment, the reference distance is determined to be longer when the return travel speed is higher, and shorter when the return travel speed is lower. The relationship between the return travel speed and the reference distance is, however, not limited to such.

Figure 3:
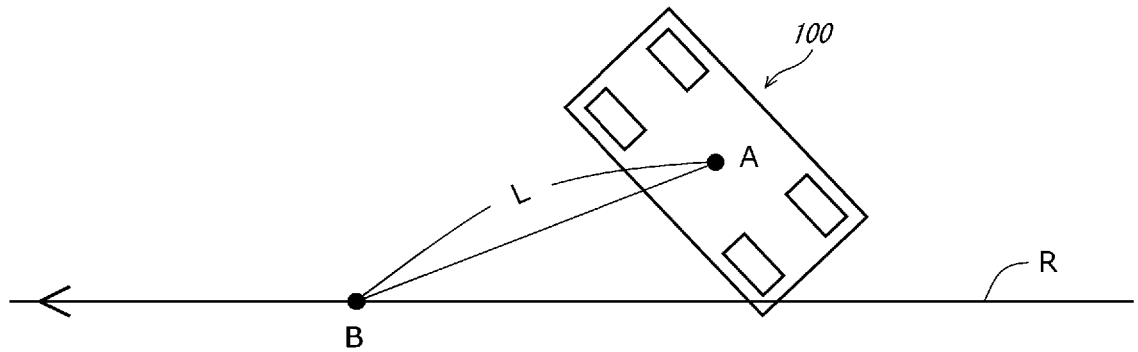
FIG. 3 is a diagram explaining a method of determining a return position.

The processing device 17 then determines the return position (step S5). In this embodiment, the return position is determined based on the reference distance determined in step S4. Specifically, as illustrated in FIG. 3, position B that is on travel route R and is reference distance L away from the current position A of the vehicle 100 is determined as the return position. The return position B is located ahead of the vehicle 100 in the direction of travel of the travel route R.

Figure 4:
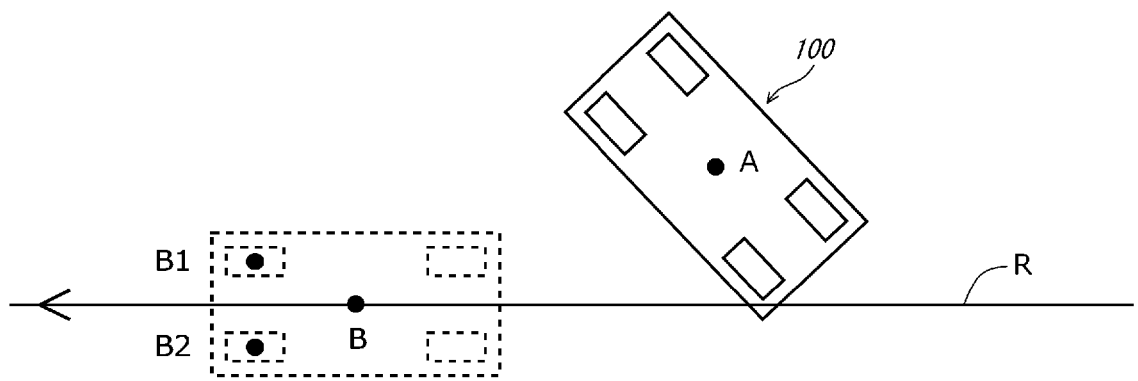
FIG. 4 is a diagram explaining a method of calculating a target position.

The processing device 17 then calculates the target position of the first tire 11 and the target position of the second tire 12 (step S6). As illustrated in FIG. 4, the target position B1 of the first tire 11 is such a position of the first tire 11 that allows the vehicle 100 to travel on the travel route R when located at the return position B. Likewise, the target position B2 of the second tire 12 is such a position of the second tire 12 that allows the vehicle 100 to travel on the travel route R when located at the return position B.

For example, as illustrated in FIG. 4, in the case where the travel route R is straight, the respective positions of the first tire 11 and the second tire 12 when the vehicle body 10 is located at the return position B and the longitudinal direction (front-back direction) of the vehicle body 10 is parallel to the travel route R are the target position B1 of the first tire 11 and the target position B2 of the second tire 12.

Figure 5:
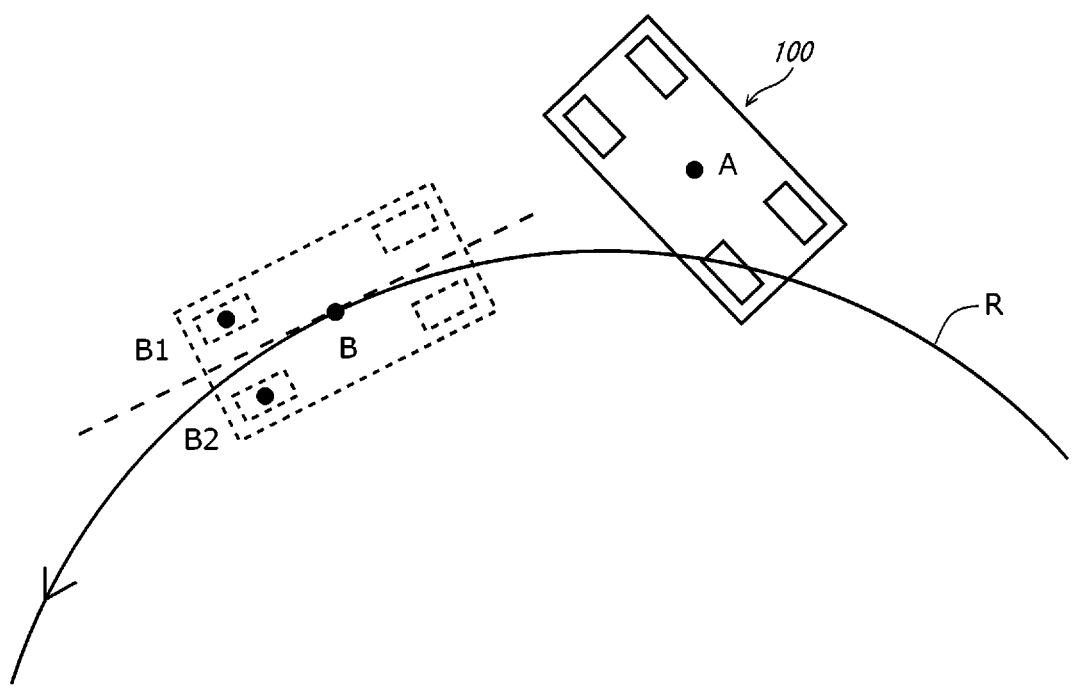
FIG. 5 is a diagram explaining a method of calculating a target position in the case of a curved travel route.

For example, as illustrated in FIG. 5, in the case where the travel route R is curved, the respective positions of the first tire 11 and the second tire 12 when the vehicle body 10 is located at the return position B and the longitudinal direction of the vehicle body 10 is parallel to the tangent to the travel route R are the target position B1 of the first tire 11 and the target position B2 of the second tire 12.

Figure 6:
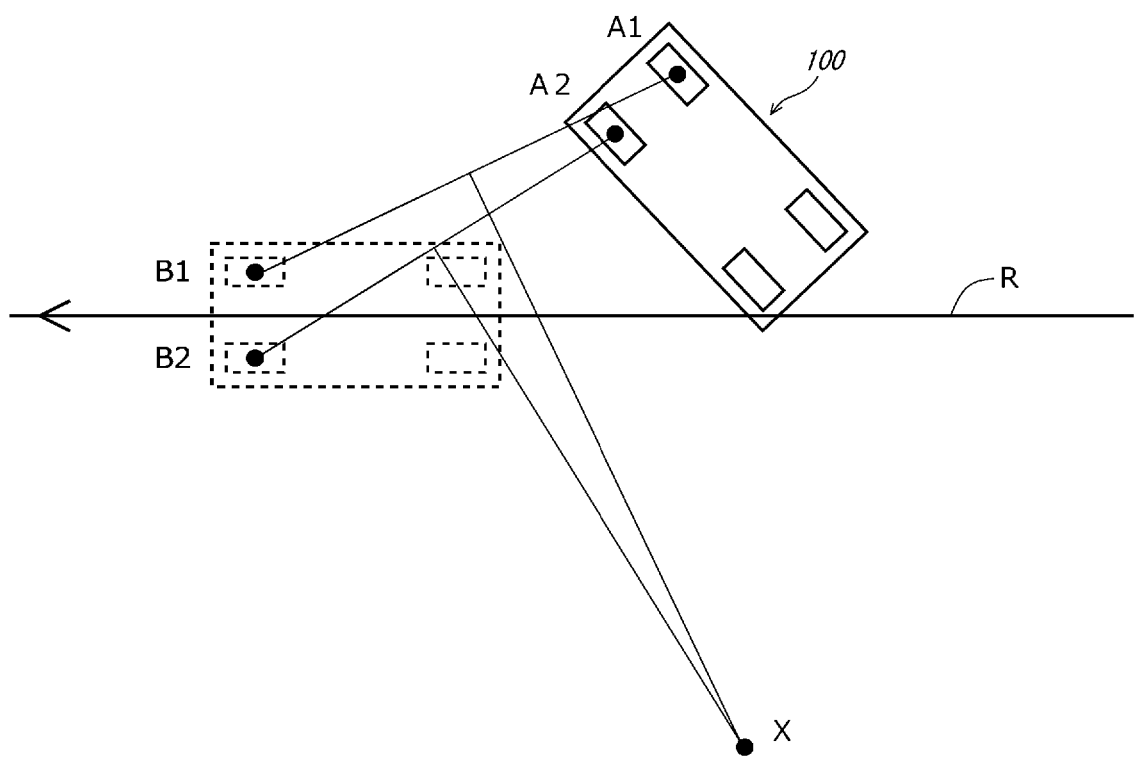
FIG. 6 is a diagram explaining a method of finding a common central point.

The processing device 17 then finds a common central point (step S7). As illustrated in FIG. 6, the common central point X is a point at which the distance from the current position A1 of the first tire 11 and the distance from the target position B1 of the first tire 11 are the same and the distance from the current position A2 of the second tire 12 and the distance from the target position B2 of the second tire 12 are the same. That is, the common central point X is the intersection point of the perpendicular bisector of the straight line connecting the current position A1 and the target position B1 of the first tire 11 and the perpendicular bisector of the straight line connecting the current position A2 and the target position B2 of the second tire 12.

Figure 7:
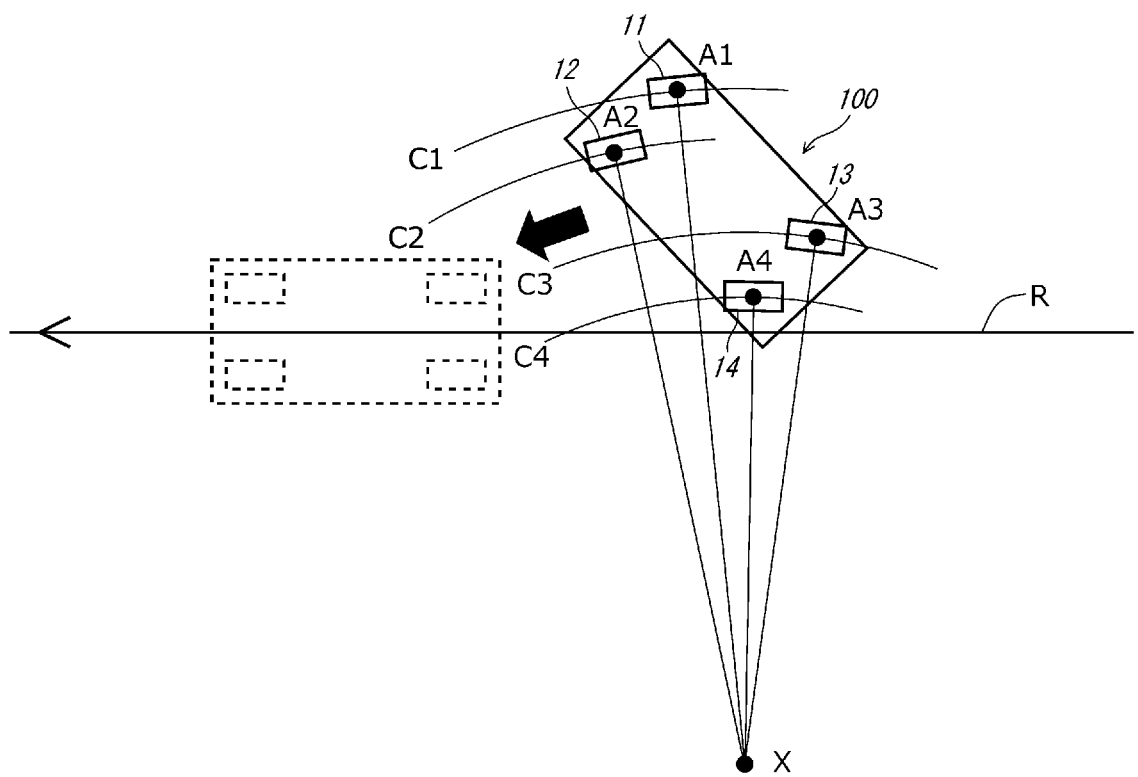
FIG. 7 is a diagram explaining a method of setting the steering angle of each tire.

The processing device 17 then sets the steering angle of each of the tires 11 to 14 (step S8). Specifically, as illustrated in FIG. 7, the steering angle of the first tire 11 is set so that the first tire 11 will be oriented in the direction of the tangent to a clearance circle C1 whose center is the common central point X obtained in step S7 and whose radius is the distance from the current position A1 of the first tire 11 to the common central point X. Likewise, the steering angle of each of the tires 12 to 14 other than the first tire 11 is set so that the tire will be oriented in the direction of the tangent to a corresponding one of clearance circles C2 to C4 whose center is the common central point X and whose radius is the distance from the current position of the tire to the common central point X.

The processing device 17 then rotates the tires 11 to 14 toward the travel route of the vehicle 100 (step S9). The processing device 17 may rotate each of the tires 11 to 14 at the same rotation speed, or at a different rotation speed depending on the distance from the current position to the target position of the tire. For example, a tire for which the distance from the current position to the target position is long may be rotated at a higher rotation speed than a tire for which the distance from the current position to the target position is short.

After step S9, the processing device 17 returns to step S1, and repeats steps S1 to S9 until the vehicle 100 returns to the travel route. Thus, the processing device 17 constantly updates the return position (step S5) and constantly updates the set steering angle of each of the tires 11 to 14 according to the updated return position (step S8) until the vehicle 100 that has deviated from the travel route returns to the travel route. Steps S1 to S8 may be executed while rotating the tires 11 to 14 (i.e. during execution of step S9). In such a case, as the vehicle 100 approaches the travel route, the steering angle of each of the tires 11 to 14 is corrected so that the tire will be oriented in the direction along the travel route. Consequently, upon reaching the return position, the vehicle 100 can immediately travel on the travel route.

Alternatively, the set steering angle of each of the tires 11 to 14 may be maintained until the vehicle 100 returns to the travel route, without repeating steps S1 to S9. Even in this case, by adjusting the steering angle of each of the tires 11 to 14 so that the tire will be oriented in the direction of travel of the travel route after the vehicle 100 reaches the return position, the vehicle 100 can immediately travel on the travel route. That is, the vehicle 100 can quickly return to the travel route.

With the foregoing route return program, the common central point is a point at which the distance from the current position of the first tire 11 and the distance from the target position of the first tire 11 are the same and the distance from the current position of the second tire 12 and the distance from the target position of the second tire 12 are the same (step S7). Alternatively, the common central point may be determined in consideration of the slippage, etc. of each of the tires 11 to 14. That is, the common central point may be a point at which the difference between the distance from the current position of the first tire 11 and the distance from the target position of the first tire 11 is within a predetermined range and the difference between the distance from the current position of the second tire 12 and the distance from the target position of the second tire 12 is within a predetermined range.

With the foregoing route return program, the steering angle of each of the tires 11 to 14 is set so that the tire will be oriented in the direction of the tangent to a clearance circle whose center is the common central point and whose radius is the distance from the tire to the common central point (Step S8). Alternatively, the steering angle of each of the tires 11 to 14 may be set so that the tire will be oriented in a direction whose angle difference from the direction of the tangent to the clearance circle whose center is the common central point and whose radius is the distance from the tire to the common central point is within a predetermined range.

With the foregoing route return program, the common central point is determined based on the current position and the target position of each of two tires, i.e. the first tire 11 and the second tire 12 (step S7, FIG. 6). Alternatively, the common central point may be determined based on the current position and the target position of each of three or more tires.

<Effects, Etc.>

As described above, the vehicle according to this embodiment is a vehicle configured to travel on a preset travel route, comprising: a plurality of tires including a first tire and a second tire, and each configured to be set at a different steering angle; and a processing device configured to set a steering angle of each of the plurality of tires, wherein the processing device is configured to: when the vehicle deviates from the travel route and returns to the travel route, determine a return position on the travel route, and calculate a target position of the first tire and a target position of the second tire that allow the vehicle to travel on the travel route when located at the return position; find a common central point at which a difference between a distance from a current position of the first tire and a distance from the target position of the first tire is within a predetermined range and a difference between a distance from a current position of the second tire and a distance from the target position of the second tire is within a predetermined range; and set the steering angle of each of the plurality of tires so that the tire will be oriented in a direction of a tangent to a clearance circle whose center is the common central point and whose radius is a distance to the common central point or oriented in a direction whose angle difference from the direction of the tangent is within a predetermined range.

Thus, the vehicle according to this embodiment can quickly locate each tire at such a position that allows the vehicle to travel on the travel route, and therefore can return to the travel route efficiently.

In the vehicle according to this embodiment, when determining the return position, the processing device is configured to determine a reference distance depending on a travel speed when the vehicle returns to the travel route, and determine the return position so that a distance from a current position of the vehicle to the return position will be the reference distance.

Thus, the vehicle according to this embodiment can appropriately determine the return position depending on the travel speed.

In the vehicle according to this embodiment, the processing device is configured to constantly update the return position and constantly update the set steering angle of each of the plurality of tires according to the updated return position until the vehicle that has deviated from the travel route returns to the travel route.

Thus, the vehicle according to this embodiment corrects the steering angle of each tire so as to be oriented in the direction along the travel route as the vehicle approaches the travel route. Consequently, upon reaching the return position, the vehicle can immediately travel on the travel route.

REFERENCE SIGNS LIST 10 vehicle body
11 first tire
12 second tire
13 third tire
14 fourth tire
tire drive device
16 positioning system
17 processing device
100 vehicle

The invention claimed is:

1. A vehicle configured to travel on a preset travel route, the vehicle comprising:
a plurality of tires including a first tire and a second tire, and each configured to be set at a different steering angle; and
a processing device configured to set a steering angle of each of the plurality of tires,
wherein the processing device is configured to:
when the vehicle deviates from the travel route and returns to the travel route, determine a return position on the travel route, and calculate a target position of the first tire and a target position of the second tire that allow the vehicle to travel on the travel route when located at the return position;
find a common central point at which a difference between a distance from a current position of the first tire and a distance from the target position of the first tire is within a predetermined range and a difference between a distance from a current position of the second tire and a distance from the target position of the second tire is within a predetermined range; and set the steering angle of each of the plurality of tires so that the tire will be oriented in a direction of a tangent to a clearance circle whose center is the common central point and whose radius is a distance to the common central point or oriented in a direction whose angle difference from the direction of the tangent is within a predetermined range.

2. The vehicle according to claim 1, wherein, when determining the return position, the processing device is configured to determine a reference distance depending on a travel speed when the vehicle returns to the travel route, and determine the return position so that a distance from a current position of the vehicle to the return position will be the reference distance.

3. The vehicle according to claim 1, wherein the processing device is configured to constantly update the return position and constantly update the set steering angle of each of the plurality of tires according to the updated return position until the vehicle that has deviated from the travel route returns to the travel route.

\* \* \* \* \*